United States Patent [19]

Shinokawa et al.

[11] Patent Number: 4,751,989
[45] Date of Patent: Jun. 21, 1988

[54] CLUTCH WITH REDUCED DRAGGING

[75] Inventors: Masahide Shinokawa; Takanori Suzuki; Hideyuki Akaba; Sadanori Nishimura; Yuji Kishizawa, all of Wako, Japan

[73] Assignee: Honda Giken Kogyo Kabushiki Kaisha, Wako, Japan

[21] Appl. No.: 929,813

[22] Filed: Nov. 13, 1986

[30] Foreign Application Priority Data

Nov. 18, 1985 [JP] Japan .................................. 60-258381
Nov. 18, 1985 [JP] Japan ............................ 60-177142[U]
Nov. 18, 1985 [JP] Japan ............................ 60-177150[U]

[51] Int. Cl.[4] ........................ F16D 67/02; F16D 13/74
[52] U.S. Cl. ................................. 192/13 R; 192/18 R; 192/70.12; 192/96; 192/109 D; 192/113 B
[58] Field of Search ............... 192/13 R, 18 R, 30 V, 192/70.12, 70.27, 96, 109 D, 113 B; 188/264 B, 264 D

[56] References Cited

U.S. PATENT DOCUMENTS

| | | | |
|---|---|---|---|
| 1,461,256 | 7/1923 | Thompson | 192/109 D |
| 1,739,946 | 12/1929 | Carhart | 192/13 R |
| 2,676,686 | 4/1954 | Fletcher | 192/18 R |
| 2,930,460 | 3/1960 | Isaacson | 192/18 R |
| 3,773,157 | 11/1973 | Koch, Jr. et al. | 192/113 B |
| 4,458,793 | 7/1984 | Riese et al. | 192/70.12 X |
| 4,540,077 | 9/1985 | Yamamoto et al. | 192/70.12 |
| 4,574,926 | 3/1986 | Bubak | 192/70.12 X |

FOREIGN PATENT DOCUMENTS 49-30047  9/1974  Japan .

Primary Examiner—Leslie A. Braun
Assistant Examiner—Richard M. Lorence
Attorney, Agent, or Firm—Stevens, Davis, Miller & Mosher

[57] ABSTRACT

A clutch for equipment which is powered by an internal combustion engine, comprising a drive member which is connected to an output shaft of the engine, a driven member connected to an input shaft of a power transmission device, a number of clutch plates which are interposed between the drive member and the driven member for frictional engagement between the two members by a pressure member which is axially moveable and is biased by a spring, a lifter member for disengagement of the two members against the biasing force acting on the pressure member, and a brake device for stopping the motion of the driven member when the power transmission between the two members is disconnected. The brake device comprises a friction plate which is provided coaxially to the input shaft of the transmission device so as to be moveable along the axial direction but fixed along the circumferential direction and a brake plate which can press the friction plate against an axial end surface of the driven member in cooperation with the axial motion of the pressure member. Since the braking action of the brake device is produced by the axial motion of the lifter member, the structure for the brake device is extremely simplified.

9 Claims, 6 Drawing Sheets

F I G. 3
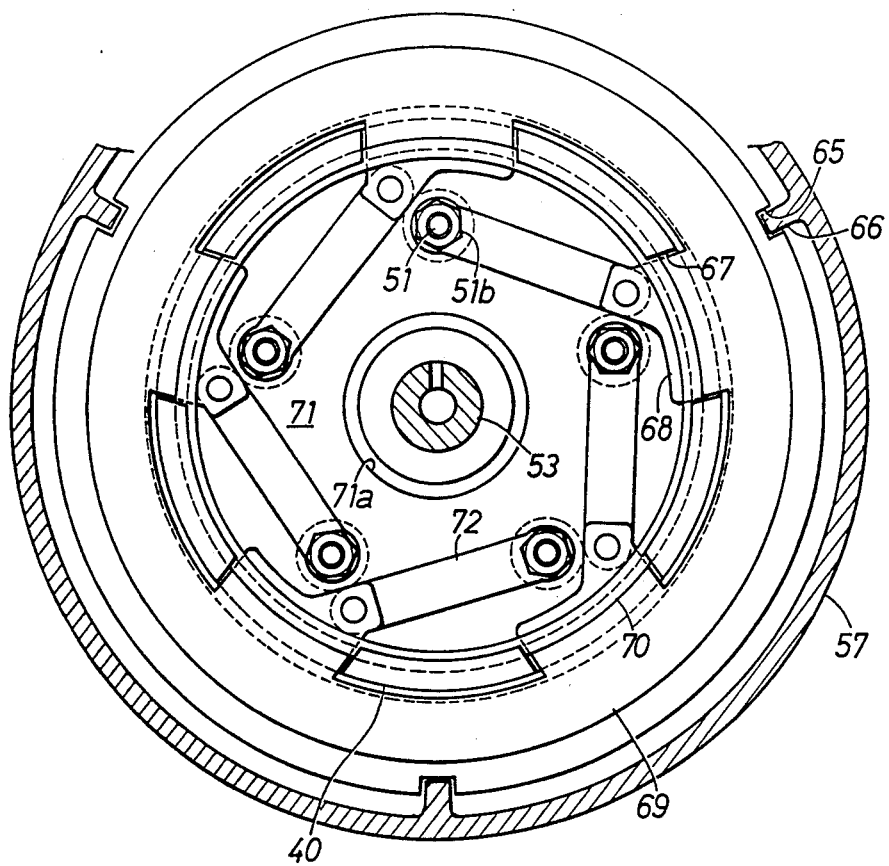

CLUTCH WITH REDUCED DRAGGING

TECHNICAL FIELD

The present invention relates to a clutch for equipment in general which is powered by an internal combustion engine and in particular to a clutch which involves less dragging when being disengaged and is suitable for use in a tractor, earth moving equipment, agricultural equipment, and so on.

BACKGROUND OF THE INVENTION

Wet-type multi plate clutches have been commonly used in the power trains for automotive vehicles and for the power take off shafts (PTO shafts) of many forms of earth moving equipment and agricultural equipment. A wet-type multi-plate clutch is suitable for such pieces of equipment which are frequently and abruptly engaged and disengaged under heavy load, but is known to involve some dragging due to the viscosity of the lubricating oil which adheres to the clutch plates. Shifting of a power transmission device is sometimes made difficult by this dragging and the attachment which is connected to the PTO shaft may not stop immediately after the clutch for the PTO shaft is disengaged. Furthermore, dragging of the clutch when it is disengaged involves unnecessary power loss by friction and is therefore undesirable in this respect also.

In order to eliminate such an inconvenience, Japanese Patent Publication No. 49-30047 proposes a brake device which comprises a friction plate which is interposed between a clutch housing and a driven shaft, and a hydraulic actuator provided in the clutch housing for applying braking force to the friction plate.

However, the provision of such a braking device for preventing dragging of a clutch means addition of a large number of component parts to the clutch, increased complexity of the structure and higher manufacturing cost. Furthermore, the braking device must be properly lubricated for preventing excessive wear and heat generation of the brake device in addition to lubricating the clutch plates of the clutch.

A multi plate clutch is capable of transmitting large power for its size but has been known to lack the capability of producing a half engaged state which is favorable for starting off a vehicle, as compared with a single plate clutch. Therefore, an inexperienced operator may have some difficulty in starting off a tractor equipped with such a clutch.

BRIEF SUMMARY OF THE PRESENT INVENTION

In view of such problems of the prior art, a primary object of the present invention is to provide a clutch for powered equipment which is equipped with a simple braking device for effectively reducing the dragging of the driven member when the clutch is disengaged.

Another object of the present invention is to provide a clutch for powered equipment which is provided with an effective braking device for reducing the dragging of the driven member in which the action of the clutch is synchronized with the action of the braking device in such a manner that the braking device is automatically activated when the clutch is disengaged.

Yet another object of the present invention is to provide a clutch for powered equipment which is provided with an effective braking device for reducing the dragging of the driven member and is yet light in weight and durable at the same time.

Yet another object of the present invention is to provide a clutch for powered equipment in which lubrication of the clutch plate is performed without supplying excessive lubricating oil to the clutch plate when the clutch is disengaged so that the dragging of the clutch due to the viscosity of the lubricating oil adhering to the clutch plate can be minimized.

Yet another object of the present invention is to provide a clutch for powered equipment provided with a braking device for reducing the dragging of the driven member in which the braking device is also properly lubricated only when activated so that the lubricating oil is efficiently utilized since the clutch plate and the brake device are not positively lubricated at the same time.

Yet another object of the present invention is to provide a clutch for powered equipment which can be disconnected briskly so as to minimize undesirable dragging of the clutch and can yet be engaged gradually so as to minimize the shock of the engagement without any special efforts on the part of the operator.

According to the present invention, such objects are accomplished by providing a clutch for equipment which is powered by an internal combustion engine, comprising a drive member which is connected to an output shaft of the engine, a driven member connected to an input shaft of a power transmission device, at least one clutch plate which is interposed between the drive member and the driven member for selective frictional engagement of the two members by way of a pressure member which is axially moveable and is biased by a biasing means so as to achieve the frictional engagement of the two members, a clutch disengagement means for disengagement of the two members against the biasing force of the biasing means acting on the pressure member, and a brake device for stopping the motion of the driven member when the power transmission between the two members is disconnected, wherein: the brake device comprises a friction plate which is provided coaxially to the input shaft of the transmission device so as to be moveable along the axial direction but fixed along the circumferential direction and a brake means which can press the friction plate against an axial end surface of the driven member in cooperation with the axial motion of the pressure member.

Thus, the driven member is properly braked by the friction plate simply as a result of the axial motion of the pressure member and, therefore, no complicated structure is required for accomplishing the elimination of the dragging of the clutch. If the brake means comprises a brake plate which is connected to the pressure member by way of a strap plate which is flexible along the axial direction and can transmit force directed along the circumferential direction, the overall structure can be light in weight and durable at the same time.

According to a certain aspect of the present invention, the clutch disengagement means comprises a lifter rod which undergoes an axial motion for disengagement of the clutch by way of the pressure member and has an oil passage therein, and an oil outlet communicating with the oil passage which is effective for supplying lubricating oil to the clutch plate when the clutch is engaged and is not effective for supplying lubricating oil to the clutch plate when the clutch is disengaged. Thus, the lubrication of the clutch plate is performed without supplying excessive lubricating oil to the clutch plate when the clutch is disengaged and the dragging of the clutch due to the viscosity of the lubricating oil adhering to the clutch plate is reduced.

According to another aspect of the present invention, the oil passage provided in the lifter rod is provided with another oil outlet which is effective for supplying lubricating oil to the friction plate of the brake device when the clutch is disengaged and is not effective for supplying lubricating oil to the friction plate of the brake device when the clutch is engaged. Thus, the brake device is also properly lubricated and the lubricating oil is efficiently utilized since the clutch plate and the brake device are not positively lubricated at the same time.

According to yet another aspect of the present invention, there is provided a baffle plate which substantially separates the brake device from the clutch by a plane which is substantially perpendicular to the axial line of the clutch, and the two oil outlets of the oil passage in the lifter rod are arranged on the different sides of the baffle plate. This feature enhances the advantages of the above mentioned structure of lubrication.

According to yet another aspect of the present invention, a plurality of friction plates are interposed between the drive member and the driven member and the clutch further comprises a first spring means for biasing the pressure member so as to engage the friction plates between the drive member and the driven member; a second spring means which elastically supports the friction plates; and a damper means associated with the lifter rod. Thereby, the engagement of the clutch can be smoothly made even by an inexperienced operator. In particular, if the damper means comprise a fluid cylinder, a piston received therein defining a small gap relative thereto, and a one-way valve provided in a hole passed through the piston, the disengagement of the clutch is performed briskly while the engagement of the clutch is performed gradually.

BRIEF DESCRIPTION OF THE DRAWINGS

The present invention will now be shown and described in the following in terms of a concrete embodiment thereof with reference to the appended drawings, in which:

FIG. 3 is a sectional view taken along line III—III of FIG. 2;

DETAILED DESCRIPTION OF THE PREFERRED EMBODIMENT

Figure 1:
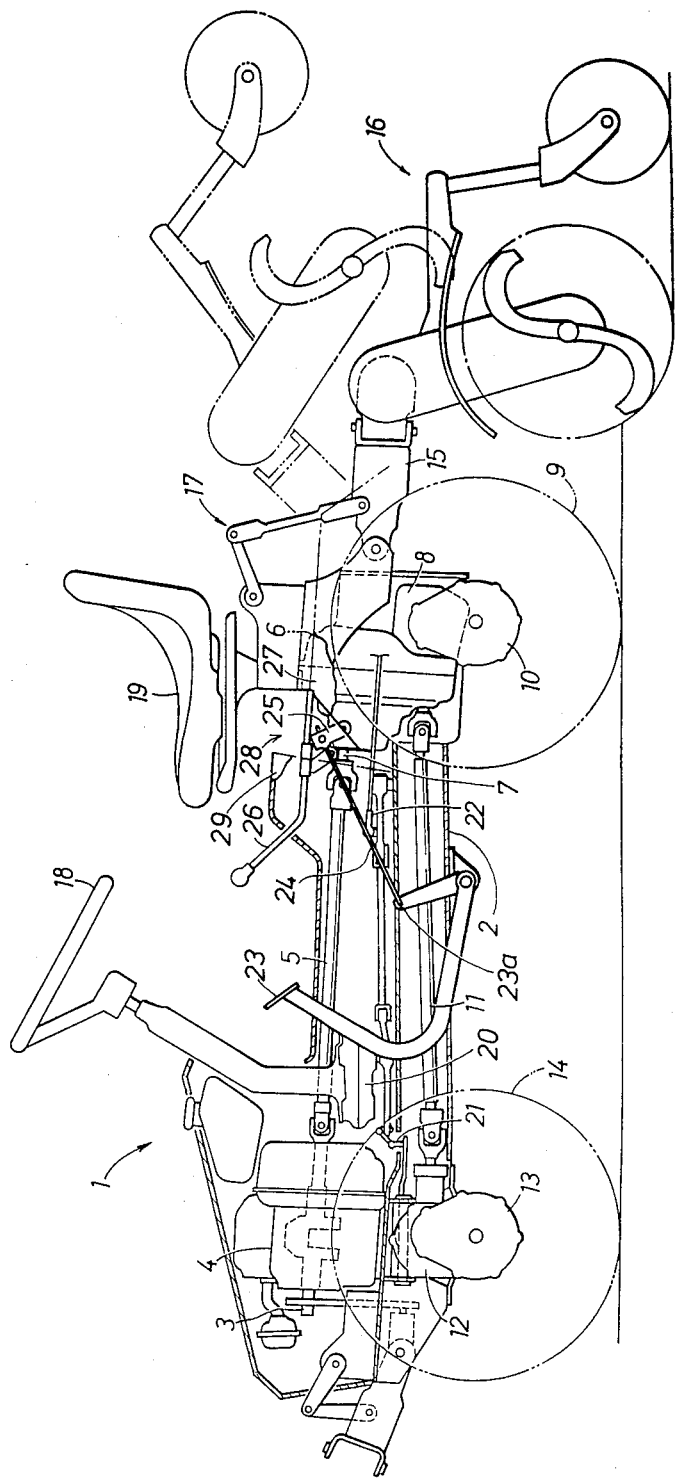
FIG. 1 is a schematic side view of an agricultural tractor to which the clutch according to the present invention is applied.

FIG. 1 schematically shows an overall view of an agricultural tractor 1 which is provided with a wet type multi plate clutch according to the present invention, and comprises a frame 2 and an engine 4 which is mounted on the front part of the frame 2 with its crank shaft 3 aligned with the longitudinal direction of the tractor 1. The rear end of the crank shaft 3 is connected to the front end of a propeller shaft 5 and the rear end of the propeller shaft 5 is connected to an output transmission shaft 7 which serves as the input shaft of a power transmission device 6 mounted on the rear part of the frame 2.

The power of the engine 4 transmitted to the output transmission shaft 7 is split into two paths by the gears arranged within the power transmission device 6; part of the power of the engine is transmitted to the rear wheels 9 by way of a differential device 8 for the rear wheels provided in the rear part of the power transmission device 6 and a final reduction gear device 10 which depends from the differential device 8 and the rest of the power is transmitted to the front wheels 14 by way of a front wheel propeller shaft 11 which is connected between the power transmission device 6 and a differential device 12 for the front wheels and extends within the frame 2 along the longitudinal direction, and a front wheel final reduction gear device 13 which is provided between the differential device 12 and the front wheels 14.

Further, a sub transmission device (not shown in the drawings) is provided in the hitch box 15 which is attached to the rear part of the power transmission device 6 so as to be rotatable in a vertical plane parallel to the longitudinal line of the tractor 1 and this sub transmission device is connected between the output end of the power transmission device 6 and a PTO shaft (not shown in the drawings) to the end of driving accessory equipment such as a rotary tiller 16 which is attached to the hitch box 15. The vertical position of the hitch box 15 can be adjusted as shown by the imaginary lines in FIG. 1 by a hoist device 17 which is provided above the power transmission device 6.

A steering wheel 18 and a seat 19 are provided in the middle part of the tractor 1 in such a manner that the operator who is seated in the seat 19 can steer both the front and rear wheels 14 and 9 by turning the steering wheel 18 which is connected to the front and rear wheels 14 and 9 by way of a steering gear box 20 provided under the steering wheel 18 and steering rods 21 and 22 for the front wheels 14 and the rear wheels 9, respectively. At the feet of the operator who is seated in the seat 19 is provided a clutch pedal 23 which is connected to a clutch arm 25 of the power transmission device 6 for disconnecting the clutch by way of an arm 23a which is fixedly attached to the clutch pedal 23 and a clutch rod 24. A shift lever 26 projects generally upwardly from the power transmission device 6 to a position adjacent to one side of the seat 19.

The clutch arm 25 is placed in a position which is visible through the gap 28 between the rear cover 29 and the rear fender 27 so that the extent of the wear of the clutch may be visually inspected by the angle of the clutch arm 25 in the neutral state of the clutch device by simply looking through the gap 28.

Figure 2:
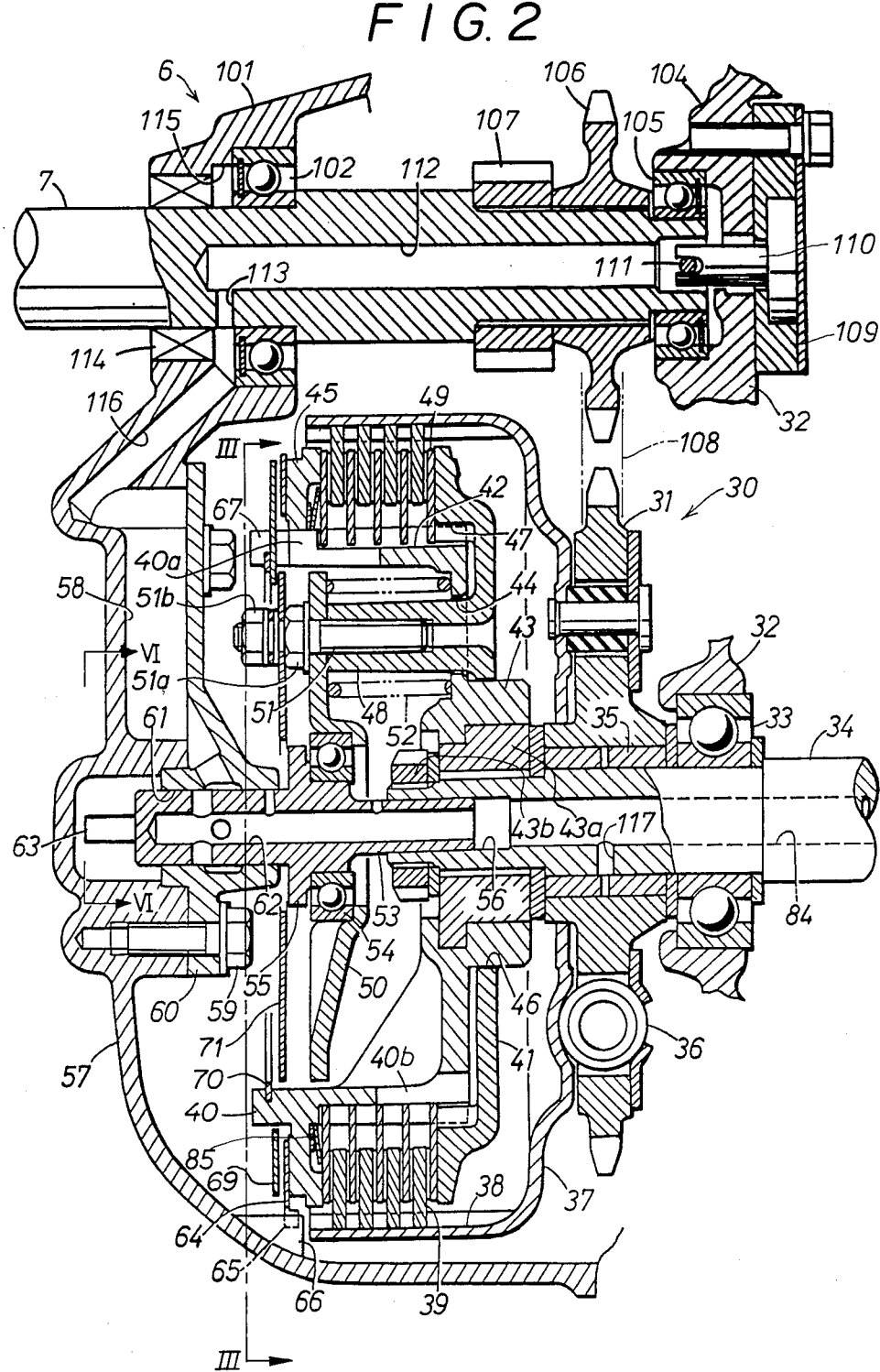
FIG. 2 is a sectional view of an embodiment of the clutch according to the present invention.

FIG. 2 shows the wet type multi plate clutch device 30 which is incorporated in the power transmission device 6 of FIG. 1. The output transmission shaft 7 is rotatably supported by a pair of sealed ball bearings 102 and 105 which are fitted into the portions 101 and 104 of the clutch housing 57 and the transmission casing 32, respectively. The end of the output transmission shaft 7 which is received within the power transmission device 6 is provided with a sprocket 106 and a pinion gear 107 next to each other and the sprocket 106 transmits the power of the engine 4 to a sprocket 31 of the clutch device 30 by way of a chain 108 while the pinion 107 meshes with a gear of the power device (not shown in the drawings) for the lift device 17.

The sprocket 31 is rotatably supported on an input shaft 34 of the power transmission device 6 by way of a slide bearing 35 and the input shaft 34 is in turn supported by the transmission casing 32 by way of a ball bearing 33. The sprocket 31 is connected to a drive member 37 by way of spring members 36 which are intended for absorbing the rotational shock upon engagement of the clutch.

The drive member 37 is a cup shaped member having longitudinal spline teeth 38 in its inner circumferential surface and is connected at its bottom end to the sprocket 31. A plurality of annular drive clutch plates 39 having teeth for meshing with the teeth 38 along their outer circumferential edges are fitted into the drive member 37 so as to be mutually axially moveable but integrally rotatable by the meshing of the teeth of the drive clutch plates 39 and the drive member 37. Additionally, the drive member 37 receives a driven member 40 and a pressure plate 41 as described hereinafter.

The driven member 40 is also cup shaped and is provided with a central boss 43 in its bottom wall which is fixedly fitted onto the input shaft 34 by way of a sleeve member 43a and a nut 43b which is threaded on the free end of the input shaft 34. The outer circumferential surface of the driven member 40 is provided with axial spline teeth 42 for axially slidably fitting thereon a plurality of driven clutch plates 49 which are provided with corresponding teeth along their inner circumferential edges. A plurality of holes 44 are provided in the bottom wall of the driven member 40 along a circle coaxial to the boss 43 for receiving the axial bosses 48 of the pressure plate 41 therein. The outer circumferential surface of the open end of the driven member 40 is provided with a radial flange 45 having an outer diameter which is slightly smaller than the inner diameter of the drive member 37. Further, axial slits 40a and 40b including those 40b extending into the bottom wall of the driven member 40 and those 40a extending into the open end of the driven member 40 in an alternating manner are provided through the circumferential wall of the driven member 40 at equal interval along the circumferential direction thereof.

The pressure plate 41 consists of a disk member having a substantially same outer diameter as the flange 45 of the driven member 40 and is interposed between the bottom wall of the drive member 37 and the bottom wall of the driven member 40 with its central hole 46 freely receiving the boss 43. The pressure plate 41 is provided with spline teeth 47 which mesh with the corresponding spline teeth 42 of the driven member 40 and the bosses 48 which are passed through the holes 44 provided in the bottom wall of the driven member 40. Thus, the driven member 40 and the pressure plate 41 are adapted to rotate integrally together and to be freely movable along the axial direction relative to each other.

The annular driven clutch plates 49 are fitted over the outer circumferential surface of the driven member 40 by means of the meshing of the spline teeth 42 of the driven member 40 and the similar spline teeth provided in the inner circumferential edges of the driven clutch plates 49, so as to alternate the positions with the drive clutch plates 39 along the axial direction. The outer most driven clutch plate 49 is elastically supported by a conical disc spring 85 with respect to the flange 45 of the driven member 40.

A lifter plate 50 is attached to the free ends of the bosses 48, of the pressure plate 41, passed through the holes 44 of the bottom wall of the driven member 40, by way of stud bolts 51 which are passed through the lifter plate 50 and the nuts 51a which are threaded to the stud bolts 51 so as to securely hold the lifter plate 50 between the nuts 51a and the end surfaces of the bosses 48. A compression coil spring 52 surrounds each of the bosses 48 and is interposed between the bottom wall of the driven member 40 and the opposing surface of the lifter plate 50, thereby biasing the flange 45 of the driven member 40 and the outer circumferential portion of the pressure plate 41 opposite to the flange 45 towards each other so as to bring the drive clutch plates 39 and the driven clutch plates 49 into engagement.

A lifter rod 53 is freely rotatably received by the central hole of the lifter plate 50 by way of a ball bearing 54. The lifter rod 53 is provided with a radial flange 55 which engages with an end surface of the inner ring of the ball bearing 54 in such a manner than a thrust that is applied to the lifter rod 53 and directed towards the input shaft 34 can be transmitted to the lifter plate 50 by way of the ball bearing 54. Further, an end of the lifter rod 53 is received in an axial bore 56 of the input shaft 34 in an axially slidable manner while the other end of the lifter rod 53 is fitted into a guide hole 61 which is provided through an oil guide plate 60. The oil guide plate 60 is fixedly attached to the internal surface of the housing 57 by way of threaded bolts 59 so as to define oil passages 58 therebetween. The lifter rod 53 is provided with an axial bore 62 which is open at its input shaft 34 end and is closed at its oil guide plate 60 end. This axial bore 62 conducts the lubricating oil supplied from a lubricating oil pump 109 which is described hereinafter to the clutch device and the interior of the power transmission device. A release lever 63 is engaged to the end surface of the other end of the lifter rod 53 so that the lifter rod 53 can be pushed into the axial bore 56 of the input shaft 34 against the biasing force of the coil spring 52 by depressing the clutch pedal 23 which was described earlier in connection with FIG. 1.

The lubricating oil pump 109 is fixedly attached to the internal wall of the transmission casing 32 adjacent to the portion 104 and is connected, in a coaxial manner, to the output transmission shaft 7. This pump 109 may be of a known type such as a trochoid pump and the free end of the rotor shaft 110 of the pump 109 is engaged to a pin 111 which is fitted to the free end of the output transmission shaft 7, for the purpose of driving the rotor shaft 110 with the output transmission shaft 7.

The pump 109 is provided with an oil inlet (not shown in the drawings) on one side thereof and supplies the lubricating oil, which is collected, by way of this oil inlet, from the bottom of the transmission casing 32 and filtered by an oil filter (not shown in the drawings), to an oil passage 112 which is formed in the output transmission shaft 7. The oil passage 112 in the output transmission shaft 7 terminates adjacent to the bearing portion 101 of the clutch housing 57 and a radial outlet 113 is provided adjacent to the terminal end of the oil passage 112.

The bore of the bearing portion 101 of the clutch housing 57 is fitted with a seal member 114 surrounding the output transmission shaft 7 and an annular oil groove 115 is defined between the seal member 114 and the ball bearing 102. A communication passage 116 is defined in the clutch housing 57 between the annular groove 115 and the oil passage 58 which was mentioned earlier.

The open end of the driven member 40 projects axially outwardly from the end surface of the flange 45 and an annular friction plate 64, which is permitted to move axially but is prevented from rotating by engagement of a plurality of notches 65 provided on its outer circumferential edge with axial guide ribs 66 provided in the inner circumferential surface of the housing 57 as best shown in FIG. 3, surrounds the projecting open end of the driven member 40. As best shown in FIG. 3, the axial end surface of the open end of the driven member 40 is provided with a plurality of notches 67 at equal interval along the circumferential direction and a brake plate 69 having radial projections 68 conforming to the notches 67 and having a substantially same outer diameter as the flange 45 of the driven member 40 is fitted over the outer circumferential surface of axial end portion of the driven member 40 and is axially secured by a stop ring 70 which is fitted into the inner circumferential surface of the open end of the driven member 40 and engages the free ends or the inner ends of the radial projections 68.

A circular baffle plate 71 is located between the brake plate 69 and the lifter plate 50 with its central hole fitted over the lifter rod 53 and is securely attached to the free ends of the stud bolts 51 as described hereinafter.

The inner circumferential edges of the projections 68 of the brake plate 69 are connected by rivets to one end of strap plates 72 which are made of spring steel plate of small thickness. The other ends of the strap plates 72 are secured to the free ends of the stud bolts 51 by being interposed between the baffle plate 71 which is in turn fitted over the stud bolts 51 and engaged to the nuts 51a fixedly securing the pressure plate 41 to the free ends of the bosses 48 and nuts 51b which are threaded to the outer most ends of the stud bolts 51 so that the brake plate 69 and the pressure plate 41 can rotate integrally with each other by way of the strap plates 72.

Figure 4:
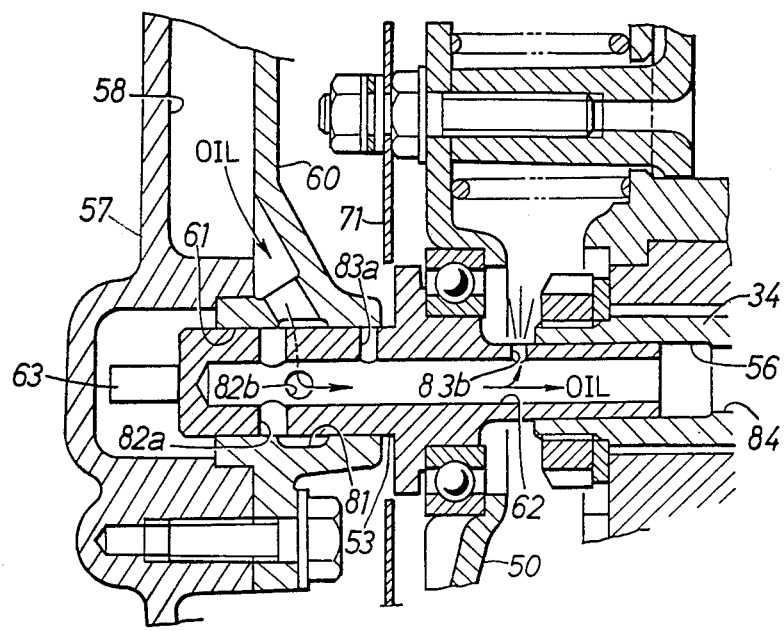
FIGS. 4 and 5 are enlarged sectional views showing two different states of a part of FIG. 2.
Figure 5:
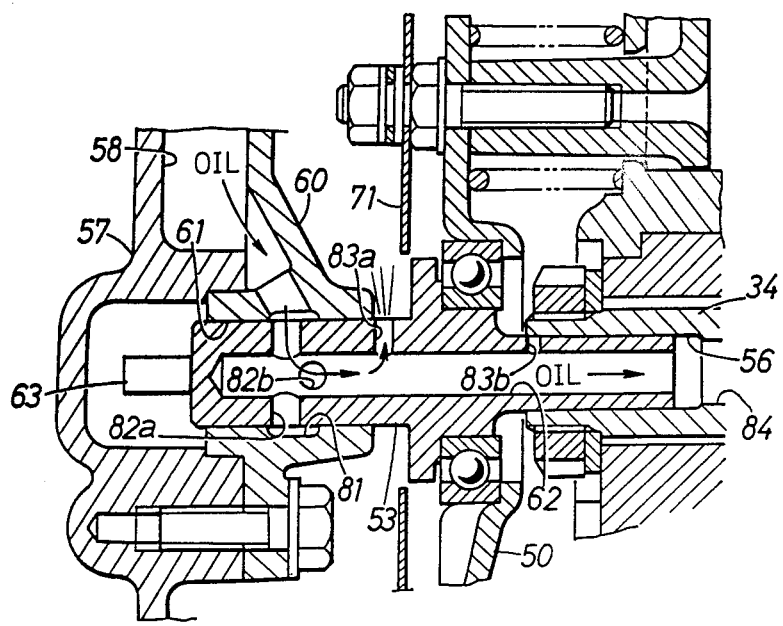

As best shown in FIGS. 4 and 5, the lubricating oil passage 58 defined between the housing 57 and the oil guide plate 60 is communicated to an annular groove 81 provided in the inner circumferential surface of the guide hole 61 which slidably receives the one end of the lifter rod 53. The one end of the lifter rod 53 which is received in the guide hole 61 is provided with two pairs of diametral holes 82a and 82b and at least one of pairs communicate the annular groove 81 with the axial oil passage 62 provided in the lifter rod 53 depending on the axial position of the lifter rod 53. The lifter rod 53 is additionally provided with a pair of oil outlets 83a and 83b at the positions on either side of the baffle plate 71 and these oil outlets 83a and 83b communicate with the axial oil passage 62.

Since the oil holes 82a and 82b are provided in mutually axially offset positions and the diametral lines of the paired holes are perpendicular to each other, at least either one of the pairs of the diametral oil holes 82a and 82b align with the annular groove 81 and a certain amount of lubricating oil is always supplied to the oil passage 62 even when the axial position of the lifter rod 53 is varied by the actuation of the release lever 63.

The positions of the oil outlets 83a and 83b are positioned in the lifter rod 53 in such a manner that one of the oil outlets 83a is covered by the guide hole 61 while the other oil outlet 83b is exposed from the axial end portion of the input shaft 34 when the lifter rod 53 is located at the position for connecting the clutch as shown in FIG. 4, and the one oil outlet 83a is exposed from the guide hole 61 while the other oil outlet 83b is covered by the axial end portion of the input shaft 34 when the lifter rod 53 is located at the position for disconnecting the clutch as shown in FIG. 5.

Figure 6:
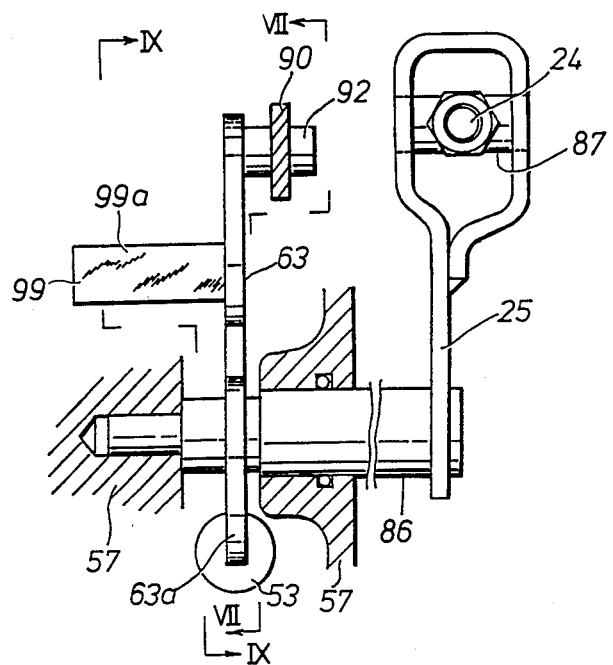
FIG. 6 is a sectional view taken along line VI—VI of FIG. 2.

FIG. 6 shows the structure of the release lever 63 in greater detail. This release lever 63 is pivotably attached to the housing 57 by a pivot shaft 86, and a lifter cam 63a which is formed at one end of the release lever 63 engages the axial end surface of the lifter rod 53. The end of the pivot shaft 86 which extends outwardly from the housing 57 is integrally provided with the clutch arm 25 and the actuating force applied to the clutch pedal 23 is transmitted to the clutch arm 25 by way of the clutch rod 24 and an engagement position 87 of the clutch arm 25 (See FIG. 1).

Figure 7:
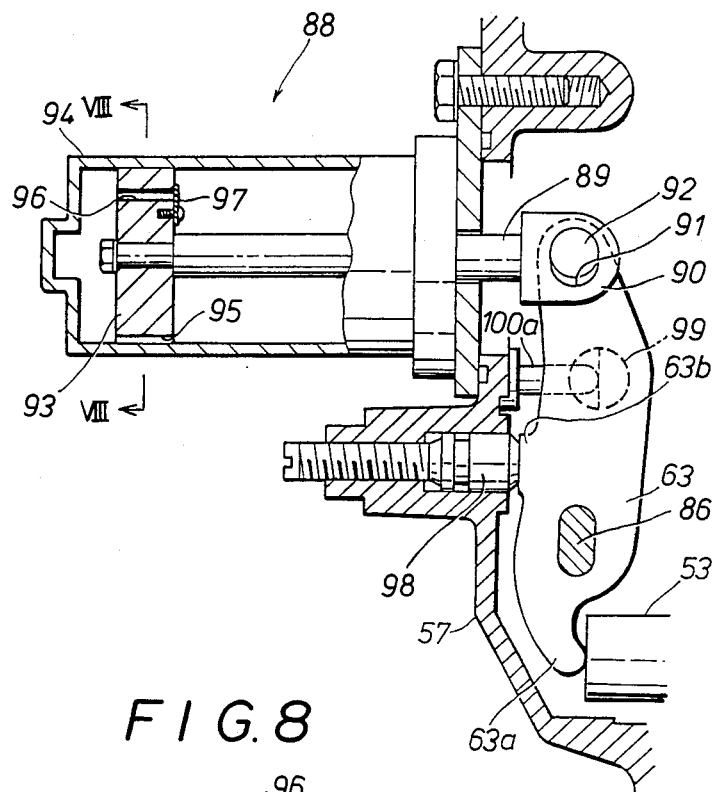
FIG. 7 is a sectional view taken along line VII—VII of FIG. 6.

As best shown in FIG. 7, a pin 92 projects laterally from the free end of the release lever 63, opposite to the end provided with the lifter cam 63a, and is engaged in a slot 91 formed in an engagement member 90 which is integrally attached to the external end of a piston rod 89 of a damper 88. The damper 88 comprises a cylinder 94 which is filled with viscous fluid such as lubricating oil and receives therein a piston 93 which is fixedly attached to the internal end of the piston rod 89, in a freely slidable manner.

Figure 8:
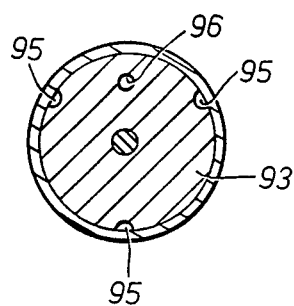
FIG. 8 is a sectional view taken along line VIII—VIII of FIG. 7.

As best shown in FIG. 8, the outer circumferential surface of the piston 93 is provided with, for instance, three notches 95 which extend the whole axial extent of the outer circumferential surface of the piston 93 and are spaced at equal interval along the circumference, and the damper 88 produces a damping action as the flow of the lubricating oil resulting from the motion of the piston 93 within the cylinder 94 is permitted only through these restricted notches 95. The piston 93 is additionally provided with an axial through hole 96 having a one-way valve 97 which permits the flow of the lubricating oil through the hole 96 when the piston 93 is pushed into the cylinder 94 but prohibits the flow of the lubricating oil through the hole 96 when the piston 93 is pulled out from the cylinder 94. When the piston 93 is pushed into the cylinder 94 by the action of the release lever 63 or when the clutch is to be disconnected, the damping force is relatively small since the lubricating oil can flow freely through the hole 96. On the other hand, when the piston 93 is pulled out from the cylinder 94 by the action of the release lever 63 or when the clutch is to be connected, the one way valve 97 is closed and a relatively large damping force is produced.

An intermediate portion of the release lever 63 is provided with an engagement portion 63b which engages with an internal end of a threaded adjustment member 98 which is threaded through the housing 57 for adjustment purpose. By turning the adjustment member 98 from the exterior of the housing 57 relative to the housing 57, the limit to the motion of the release lever 63 is determined. This adjustment member 98 is typically used for keeping the stroke of the clutch pedal 23 constant irrespective of the extent of the wear of the friction plates of the clutch device.

Figure 9:
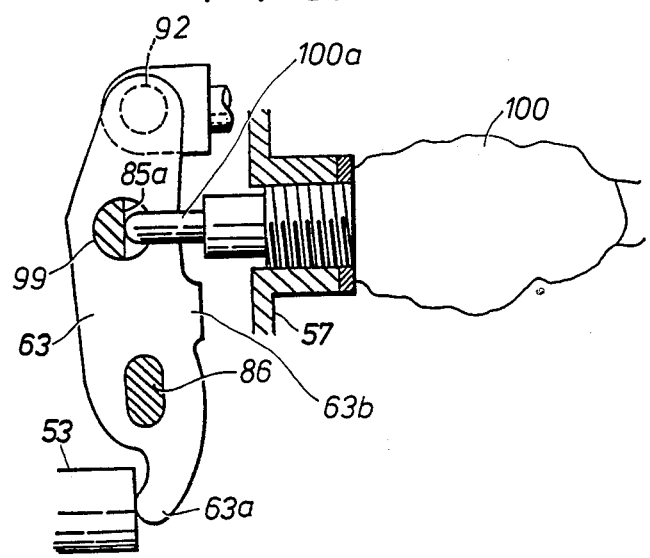
FIG. 9 is a sectional view taken along line IX—IX of FIG. 6.

As best shown in FIG. 9, a pin 99 laterally projects from the side surface of the release lever 63 opposite to the pin 92 for the damper 88 at a position located between the pin 92 and the engagement portion 63b. This pin 99 is provided with a flat surface 99a which is adapted to engage the detection end 100a of a disconnection switch 100 which is threaded to the housing 57. As the release lever 63 pivots about the pivot shaft 86, the detection end 100a of the disconnection switch 100 is depressed by the pin 99 and the disconnection of the clutch is electrically detected.

Now the action of the above-described wet type multi plate clutch device 30 is described in the following primarily with reference to FIG. 2.

The power of the engine 4 is transmitted from the sprocket 31 to the input shaft 34 by way of the multi plate clutch device 30 and when the clutch pedal 23 (FIG. 1) is left alone the input shaft 34 is rotatively driven by the engine 4 because the drive clutch plates 39 and the driven clutch plates 49 which are interposed between the flange 45 of the driven member 40 and the pressure plate 41 are in close contact under the biasing force of the coil springs 52.

If the clutch pedal 23 is depressed from this state typically with the intention of shifting the gears of the power transmission device 6 to a desired stage, the lifter rod 53 is pushed into the input shaft 34 by the release lever 63 and the pressure plate 41 which is integrally connected to the lifter plate 50 is moved away from the flange 45 of the driven member 40 against the biasing force of the coil spring 52. Thus, the pressure between the clutch plates 39 and 49 are eliminated and the transmission of power from the sprocket 31 to the input shaft 34 is interrupted.

The lubricating oil for the multi plate clutch 30 is introduced from the oil pump 109 to the oil passage 58 formed in the housing 57 by way of the oil passage 112, the radial outlet 113, the annular groove 115 and the communicating passage 116. The lubricating oil is further conducted to the oil passage 62 formed in the lifter rod 53 and part of the lubricating oil adheres to the surfaces of the clutch plates 39 and 49 because the lubricating oil is supplied from the oil outlet 83b to the clutch plates 39 and 40 when the clutch is engaged. Therefore, even when the pressure of the pressure plate 41 is released, the viscosity of the lubricating oil adhering to the clutch plates 39 and 49 could cause dragging of the driven member 40 and the input shaft 34 to the drive member 37, thereby preventing smooth shifting of the transmission gear stages.

However, according to the present invention, upon disengagement of the clutch, the brake plate 69 moves axially along with the pressure plate 41 and presses the annular friction plate 64 against the flange 45 of the driven member 40.

Because the friction plate 64 is prevented from rotating by the slots 65 thereof being engaged to the guide ribs 66 provided in the inner circumferential surface of the housing 57, a certain braking force is generated between the brake plate 69 and the end surface of the flange 45 of the driven member 40 so as to prevent the above mentioned dragging. Since the lubricating oil is supplied to the friction plate 64 from the oil outlet 83a when the clutch is disengaged as described hereinafter and the lubricating oil which has adhered to the brake plate 69, the friction plate 64 and the flange 45 produces viscous resistance, a favorable braking action is produced therebetween.

Upon engagement of the clutch, the pressure of the brake plate 69 is released by the action of the coil springs 52. Therefore, the friction loss in normal operating condition due to the action of the brake plate 69 is either eliminated or reduced to a negligible level.

Since the brake plate 69 and the pressure plate 41 are connected to each other by the strap plates 72 which are made of flexible spring steel, some freedom is given to the axial motion of the brake plate 69 and the changes in the stroke of the brake plate 69 due to the wear of the clutch plates 39 and 39 can be accommodated by the freedom of the axial movement of the brake plate 69.

Lubricating oil is supplied to the interior of the wet-type multiple-plate clutch device 30 by way of the lubricating oil passage 58 which is defined in the interior of the housing 57 and the oil passage 62 of the lifter rod 53, and when the lifter rod 53 is at the position for connecting the clutch or at the position shown in FIG. 4 the lubricating oil flows from the annular groove 81 to the oil passage 62 mainly by way of the oil holes 82b as indicated by an arrow. Since one of the oil outlets 83a is closed by the guide hole 61, the lubricating oil is supplied into the clutch device in particular to the clutch plates 39 and 49 solely through the other oil outlet 83b as indicated by an arrow and the rest of the lubricating oil is conducted to the transmission device 6 which is not shown in FIG. 4 by way of the axial holes 56 and 84 provided in the input shaft 34 to lubricate the bearing 35 by way of an oil hole 117 and other parts of the power transmission system. In this connection, due to the presence of the baffle plate 71, the lubricating oil is prevented from being blown towards the brake plate 69.

When the clutch is disconnected and the lifter rod 53 has moved to the position shown in FIG. 5, the lubricating oil is supplied to the oil passage 62 mainly by way of the oil holes 82a and then to the brake plate 69 only from the oil outlet 83a as indicated by arrows. In this case, the lubricating oil is likewise prevented from being blown towards the clutch device by the baffle plate 71.

Thus, by switching the oil outlets 83a and 83b as described above, the lubricating oil is supplied only to the surrounding of the clutch plates 39 and 49 when the clutch is connected and only to the surrounding of the brake plate 69 when the clutch is disconnected. This feature not only permits efficient utilization of the cooling action and the viscosity of the lubricating oil but also prevents the dragging of the clutch when the clutch is disconnected by stopping the supply of lubricating oil to the clutch plates 39 and 49.

Although the above described embodiment pertained to a wet type multi plate clutch, the present invention can be applied to single plate and/or dry type clutches with slight modifications which do not depart from the spirit of the present invention.

What we claim is:

1. A clutch for equipment which is powered by an internal combustion engine, comprising a drive member which is connected to an output shaft of the engine, a driven member connected to an input shaft of a power transmission device, at least one clutch plate which is interposed between the drive member and the driven member for selective frictional engagement of the two members by way of a pressure member which is axially moveable and is biased by a biasing means so as to achieve the frictional engagement of the drive member and the driven member, a clutch disengagement means for disengagement of the drive member and the driven member against the biasing force of the biasing means acting on the pressure member, and a brake device for stopping the motion of the driven member when the power transmission between the two members is disconnected, wherein:

the brake device comprises a friction plate which is provided coaxially to the input shaft of the transmission device so as to be moveable along the axial direction but fixed along the circumferential direction and a brake means which can press the friction plate against an axial end surface of the driven member in cooperation with the axial motion of the pressure member said brake means comprising a brake plate which is connected to the pressure member by way of a synchronization means, said synchronization means comprises a strap plate which is flexible along the axial direction and can transmit force along the circumferential direction.

2. A clutch for powered equipment as defined in claim 1, wherein the clutch disengagement means comprises a lifter rod which undergoes an axial motion for disengagement of the clutch, said lifter rod including an oil passage therein, and an oil outlet communicating with the oil passage said oil outlet and said oil passage comprising means for supplying lubricating oil to the clutch plate when the clutch is engaged and for not supplying lubricating oil to the clutch plate when the clutch is disengaged.

3. A clutch for powered equipment as defined in claim 2, wherein the oil passage provided in the lifter rod is provided with another oil outlet said oil passage and said another oil outlet comprising means for supplying lubricating oil to the friction plate of the brake device when the clutch is disengaged and for not supplying lubricating oil to the friction plate of the brake device when the clutch is engaged.

4. A clutch for powered equipment as defined in claim 3, further comprising a baffle plate which substantially separates the brake device from the clutch by a plane which is substantially perpendicular to the clutch axis and the two oil outlets of the oil passage in the lifter rod are arranged on the different sides of the baffle plate.

5. A clutch for powered equipment as defined in claim 4, wherein a plurality of clutch plates are interposed between the drive member and the driven member and the clutch further comprises a first spring means for biasing the pressure member so as to engage the clutch plates between the drive member and the driven member; a second spring means for elastically supporting one of said clutch plates; and a damper means associated with the lifter rod.

6. A clutch for powered equipment as defined in claim 5, the damper means comprise a fluid cylinder, a piston received therein defining a small gap relative thereto, and a one-way valve provided in a hole passed through the piston.

7. A clutch for equipment which is powered by an internal combustion engine, comprising a drive member which is connected to an output shaft of the engine, a driven member connected to an input shaft of a power transmission device, at least one clutch plate which is interposed between the drive member and the driven member for selective frictional engagement of the two members by way of a pressure member which is axially moveable and is biased by a biasing means so as to achieve the frictional engagement of the drive member and the driven member, a clutch disengagement means for disengagement of the drive member and the driven member against the biasing force of the biasing means acting on the pressure member, and a brake device for stopping the motion of the driven member when the power transmission between the two members is disconnected, wherein:

the brake device comprises a friction plate which is provided coaxially to the input shaft of the transmission device so as to be moveable along the axial direction but fixed along the circumferential direction and a brake means which can press the friction plate against an axial end surface of the driven member in cooperation with the axial motion of the pressure member said brake means comprising a brake plate which is connected to the pressure member by way of a synchronization means, said clutch disengagement means comprises a lifter rod which undergoes an axial motion for disengagement of the clutch, said lifter rod including an oil passage therein, and an oil outlet communicating with the oil passage, said oil outlet and said oil passage comprising means for supplying lubricating oil to the clutch plate when the clutch is engaged and for not supplying lubricating oil to the clutch plate when the clutch is disengaged, said oil passage is provided with another oil outlet, said oil passage and said another oil outlet comprising means for supplying lubricating oil to the friction plate of the brake device when the clutch is disengaged and for not supplying lubricating oil to the friction plate of the brake device when the clutch is engaged, said clutch further comprising a baffle plate which substantially separates the brake device from the clutch by a plane which is substantially perpendicular to the clutch axis and the two oil outlets of the oil passage in the lifter rod are arranged on the different sides of the baffle plate.

8. A clutch for powered equipment as defined in claim 7, wherein a plurality of clutch plates are interposed between the drive member and the driven member and the clutch further comprises a first spring means for biasing the pressure member so as to engage the clutch plates between the drive member and the driven member; a second spring means for elastically supporting one of said clutch plates; and a damper means associated with the lifter rod.

9. A clutch for powered equipment as defined in claim 8, the damper means comprise a fluid cylinder, a piston received therein defining a small gap relative thereto, and a one-way valve provided in a hole passed through the piston.

* * * * *